P. J. NEUBIG & C. C. NEUBIG, Jr.
DEMOUNTABLE RIM.
APPLICATION FILED SEPT. 5, 1914.
1,138,502.
Patented May 4, 1915.
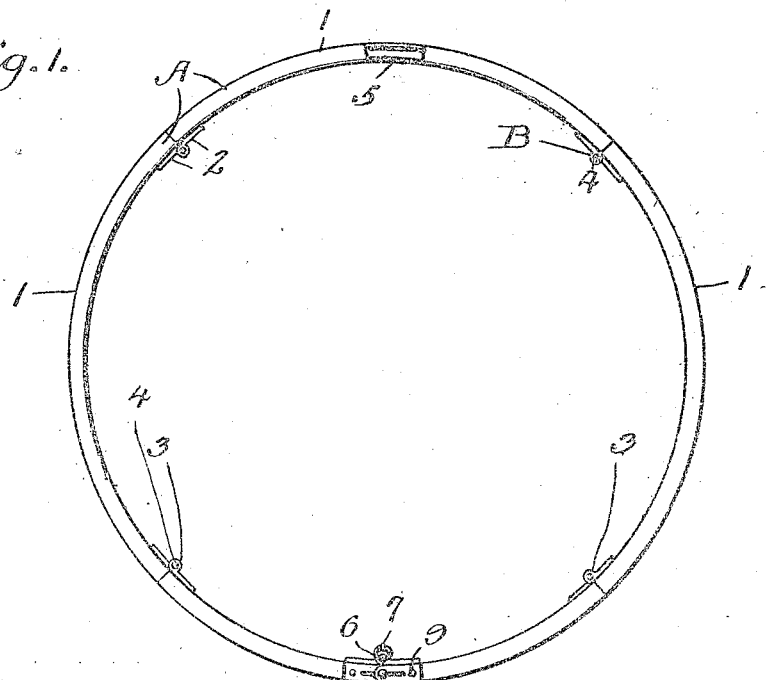
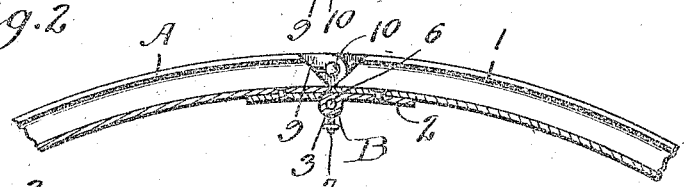
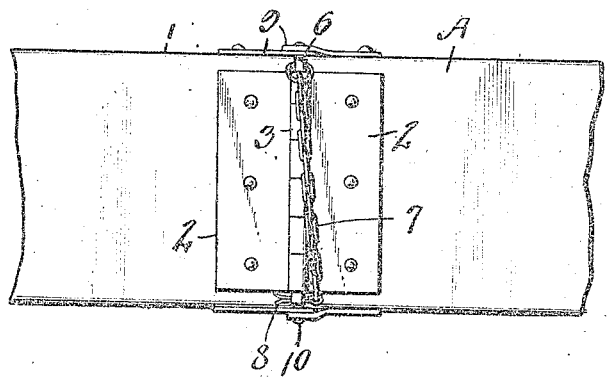
Witnesses
Inventors
P. J. Neubig and
C. C. Neubig, Jr.
By Victor J. Evans
Attorney

UNITED STATES PATENT OFFICE.

PHILIP J. NEUBIG AND CHRISTIAN C. NEUBIG, JR., OF PLAQUEMINE, LOUISIANA.

DEMOUNTABLE RIM.

1,138,502.  Specification of Letters Patent.  Patented May 4, 1915.

Application filed September 5, 1914. Serial No. 860,374.

*To all whom it may concern:*

Be it known that we, PHILIP J. NEUBIG and CHRISTIAN C. NEUBIG, Jr., citizens of the United States, residing at Plaquemine, in the parish of Iberville and State of Louisiana, have invented new and useful Improvements in Demountable Rims, of which the following is a specification.

This invention relates to automobile rims for vehicle wheels the object in view being to produce a rim of the class described which may be readily collapsed or expanded without the use of any tools whatever, said rim being applicable to any vehicle wheel and being designed to hold any form of pneumatic or other tire.

With the above and other objects in view, the invention consists in the novel construction, combination and arrangement of parts, as herein described, illustrated and claimed.

In the accompanying drawings:—Figure 1 is a side elevation of a collapsible and demountable rim embodying the present invention. Fig. 2 is an enlarged longitudinal section through two of the abutting sections of the rim at the point where the auxiliary hinge and the detachable hinge pin are employed. Fig. 3 is an inside face view of the parts shown in Fig. 2.

The detachable and collapsible tire holding vehicle wheel rim of this invention is made up of a circular series of sections each of which is designated generally at A, each section being arcuate in the direction of its length and being provided at the opposite side margins thereof with tire holding flanges 1. These flanges may be of any desired shape to hold either a clencher tire or a tire of the straight sided or other type. All of the hinges designated at B are identical in construction, each of said hinges B comprising knuckle plates 2 provided with the overlapping and interfitting knuckles 3 and the hinge pins 4 extending through said overlapping knuckles. The plates 2 may be riveted, welded or otherwise permanently fastened to the inner faces of the rim sections A.

One of the sections A is provided with a hole indicated at 5 to receive the usual inflating valve tube of the tire. At a point preferably opposite said hole 5, the hinge joint between the adjacent sections differs from the other hinge joints in that the hinge pin indicated at 6 is made detachable and has connected to one extremity thereof, one end of a pull chain 7. This chain 7 carries at its other extremity means for holding the hinge pin in place, said means indicated at 8 being in the form of a spring cotter pin or the like which is insertible through a hole in the end of the hinge pin. The chain 7 serves as a handle with which to draw the hinge pin out of engagement with the knuckles. In order to still connect the said sections of the rim pivotally together and prevent the separation thereof when the hinge pin is withdrawn by the means described and also to permit the said sections to collapse inwardly at their meeting edges, said sections are provided at opposite sides of the rim with overlapping ears 9 permanently fastened to their respective sections and pivotally connected together at 10, the pivots 10 being located about in line with the tops of the flanges 1 so as to permit the sections to collapse or fold inwardly after the hinge pin referred to has been withdrawn from the knuckles of the hinge.

In order to collapse the rim and remove the tire therefrom, the hinge pin is withdrawn by means of the chain, requiring no tools whatever. As soon as said pin is withdrawn, the two sections previously connected together thereby may be pressed inwardly and the other sections correspondingly collapsed on their hinges thus enabling the rim to be withdrawn from the tire. In reassembling the rim and tire, the operation just described is reversed and when all of the sections have been brought into their proper positions, the hinge pin carrying the pull chain is reinserted through the knuckles and locked by means of the retaining device carried by the chain.

Under the arrangement described there is no danger of pinching the inner tube since there are no tools to be employed in disconnecting the rim and tire. Furthermore the operation of removing and replacing a tire may be performed quickly and with ease.

What we claim is:—

1. A demountable tire-holding rim for vehicle wheels, embodying a circular series of arcuate sections hinged together at their adjoining extremities and each provided with tire retaining flanges, two of said sections being provided at their meeting edges with an auxiliary hinge joint, comprising overlapping and pivotally connected ears the pivots of which are located at a greater distance from the wheel center than the other hinges, and a detachable hinge pin for the hinge of the last named sections by the removal of which the rim may be collapsed inwardly while all of the sections are still hinged together.

2. A demountable tire-holding rim for vehicle wheels, embodying a circular series of arcuate sections hinged together at their adjoining extremities and each provided with tire retaining flanges, two of said sections being provided at their meeting edges with an auxiliary hinge joint, comprising overlapping and pivotally connected ears the pivots of which are located at a greater distance from the wheel center than the other hinges, a detachable hinge pin for the hinge of the last named sections by the removal of which the rim may be collapsed inwardly while all of the sections are still hinged together, a pull chain attached at one end to one extremity of said hinge pin, and retaining means at the other end of said chain for holding said hinge pin in place.

In testimony whereof we affix our signatures in presence of two witnesses.

PHILIP J. NEUBIG.
CHRISTIAN C. NEUBIG, Jr.

Witnesses:
CHAS. E. GRACE,
JULES A. CARVILLE.